June 1, 1965 J. E. SMITH, JR 3,187,313

POSITIONING METHOD AND APPARATUS FOR MAGNETIC HEAD IN A MAGNETIC RECORDING DEVICE

Filed Nov. 10, 1958

Inventor
Joseph E. Smith Jr.

by Sughrue and Rothwell Attys 3,187,313

POSITIONING METHOD AND APPARATUS FOR MAGNETIC HEAD IN A MAGNETIC RECORDING DEVICE

Joseph E. Smith, Jr., Springfield, Vt., assignor, by mesne assignment, to Ex-Cell-O Corporation, Detroit, Mich., a corporation of Michigan Filed Nov. 10, 1958, Ser. No. 772,861
11 Claims. (Cl. 340—174.1)

This invention relates to an apparatus for automatically positioning a magnetic transducer head associated with a movable magnetizable record medium.

In magnetic data storage devices of the type which have a generally movable record body with a magnetizable surface layer and one or more transducer heads positioned adjacent thereto, it is necessary to accurately maintain a predetermined air gap spacing between the tip of the transducer head and the surface of the movable record medium. As a general rule narrow air gap spacing results in better recording and read-out with the device and, hence, some magnetic data storage devices utilize an air gap spacing of less than a thousandth of an inch. Whatever the predetermined air gap spacing, it must be maintained constant in operation to achieve desirable constant signal level during recording and read out. To establish and maintain the desired minute air gap spacing during dynamic conditions presents many difficulties. Eccentricity, wobble, and run-out of any rotary parts, such as the record medium as well as thermal expansion, will cause the air gap to vary with adverse results.

In the copending application of Johnson and Miller, Serial No. 773,586, which has now issued as Patent No. 3,056,962, assigned to the assignee of this invention, there is disclosed an automatic air gap spacing arrangement for a movable magnetic data storage device wherein the combination of forces contributed by a spring biased head, a fluid motor, and an air bearing are balanced when the transducer head is correctly spaced a predetermined distance from the surface of the record medium. The fluid motor of the Johnson apparatus must be supplied with a fluid such as air under a constant pressure. It is the object of this invention to provide an automatic air gap positioning arrangement for transducer heads utilizing the hydrodynamic forces that are present during the operation of the device and having no external control medium.

It is an additional object of this invention to provide a magnetic data storage device which means for automatically retracting the transducer head when the record medium is not rotating at desired speed. Thus, when the record medium is stopped for any reason, the transducer head will not make physical contact with the surface of the record medium, hence the possibilities of damage consequent thereto will be eliminated.

Other objects and advantages of this invention will be apparent from the following detailed description and claims taken in connection with the accompanying drawings which disclose, by way of example, the principles of this invention and the best mode as well as several modifications, which exemplify diverse ways of utilizing these principles.

Briefly, this invention contemplates providing a transducer head which is movably mounted and normally biased to a position away from the surface of a record medium. This transducer may be one of several associated with a movable record storage medium such as a magnetic drum or the like. During dynamic conditions when the drum is rotating the biasing force of the spring will be overcome by the Bernoulli effects of windage and the transducer head will move closer to the surface of the moving record medium. A supporting air film which will cling to the surface of the record medium will tend to oppose the force of the Bernoulli effect when a predetermined air gap spacing is reached at a predetermined speed of the drum. Thus, during dynamic conditions a predetermined air gap is automatically maintained by the balance of the windage effect versus the forces of the spring and the supporting air cushion, and this air gap will remain constant during adverse conditions of wobble, run-out, etc. During static conditions the spring which biases the transducer head support and transducer head forces the transducer to a "fail safe" position away from the surface of the record medium such that it will not come into physical contact therewith.

Figures 1, 2, 3, 4, 5:
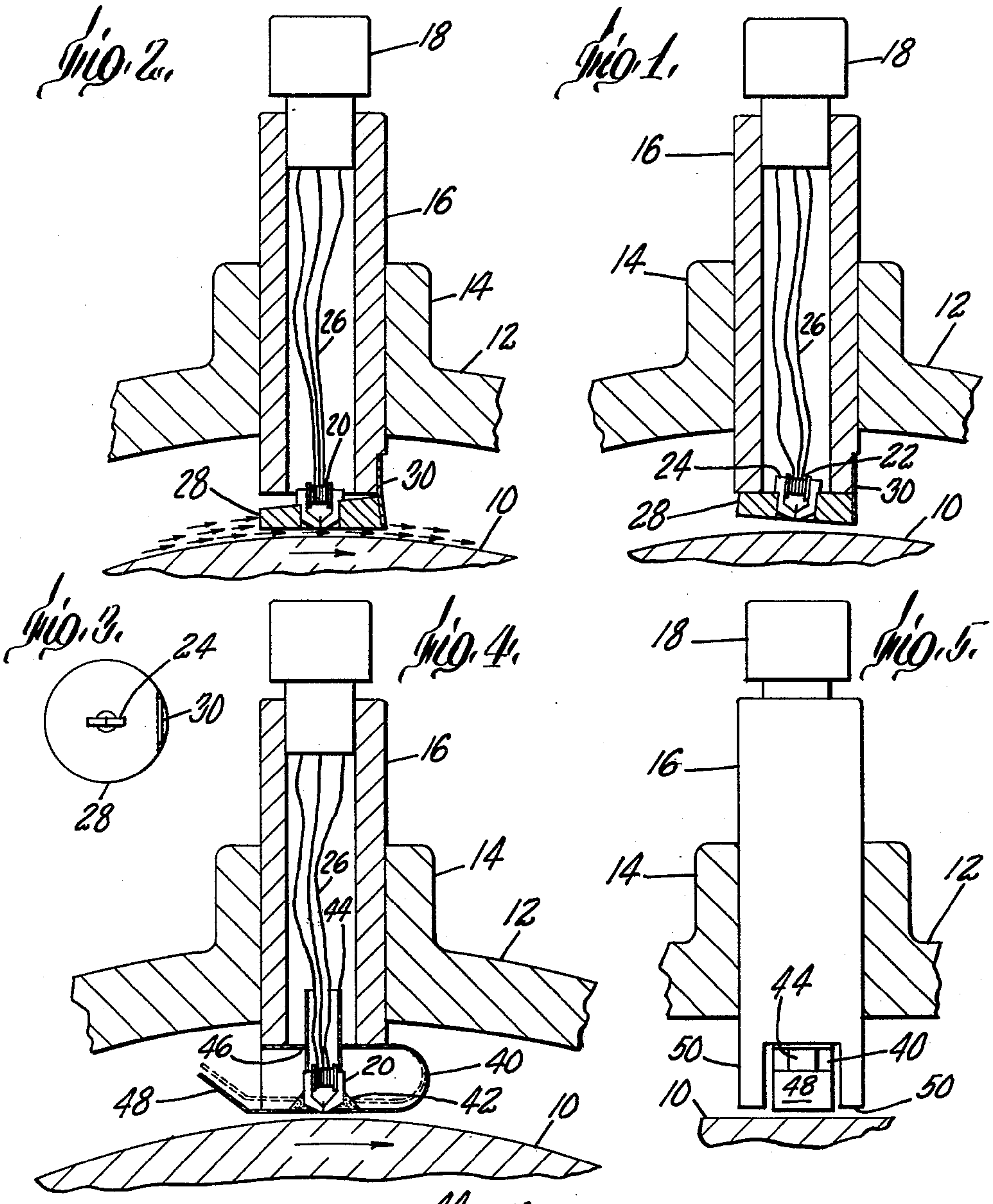
FIG. 1 is an elevation view, partly in section, showing a portion of a rotatable magnetizable record medium and a transducer head associated therewith when the device is in a static condition.
FIG. 2 is an elevation view, partly in section, similar to FIG. 1 showing the component parts when the record medium is rotating at operating speed, i.e., dynamic condition.
FIG. 3 is a bottom plan view showing the tip of the transducer head and its supporting block adjacent the record medium.
FIG. 4 is an elevation view, partially in section, showing a modification of a transducer head assembly utilizing the principles of this invention.
FIG. 5 is an end elevation view, partially in section, of the device shown in FIG. 4.

Referring to the drawings, in FIGS. 1 and 2 there is shown a record medium 10 having a magnetizable surface and a transducer head supporting housing 12 spaced therefrom. The supporting housing 12 includes a boss 14 with a hole therein for supporting a tubular member 16.

Tubular member 16 is closed on the outer end by a lead wire connecting cap 18. The lower end of tubular member 16 carries a magnetic transducer 20 having a transducer coil 22 wound on a transducer core 24 in a manner well known in the art. Transducer lead-in wires 26 are also provided for connecting to the coil 22.

The transducer 20 is fixedly secured within a support block 28. This block may be constructed of a material having high permeability to form magnetic shielding means for the operative elements of the transducer head 20. The support block 28 is hingedly secured to the tubular member 16 by a resilient reed 30. The normal bias of reed 30 tends to force the support block 28 against the lower end of the tubular member 16 as shown in FIG. 1.

The operation of the device shown in FIGS. 1–3 will now be described. During static conditions when the record medium 10 is not rotating, the resilient reed 30 will bias the transducer support block 28 and the transducer 20 carried thereby to a position as shown in FIG. 1, where there is a relatively large clearance space between the flux defining gap of the pole pieces of the transducer 20 and the surface of the record medium 10. When the record medium 10 is in operation and rotating at a desired high operating speed, a thin boundary layer of air will adhere to the surface thereof, and this air is utilized in two ways. As the air adhering to the surface layer of record medium 10 rushes into the restricted space beneath the transducer support block 28, it will increase in velocity and the pressure under the support block will decrease in accordance with Bernoulli's theorem. The windage thus created will cause a lower pressure beneath the support block 28 than above the support block and the support block will tend to move against the bias of spring 30 to a position closer to the surface of record medium 10. The magnitude and effect of this force is dependent upon the size of the block 28, the size of the space beneath the block 28 and the surface velocity of the record medium 10. The thin laminar film of air which will closely adhere to the surface of record medium 10 also provides an air bearing or cushion for the support block 28 in a manner known in the art. Thus, during dynamic conditions the bias of the spring 30 and the support provided by the air cushion will be opposed by the forces created by windage due to the increased velocity and decreased pressure of the air beneath the transducer support 28. These forces may be balanced such that the flux defining gap of the pole pieces of the transducer 20 will be a predetermined distance away from the surface layer of record medium 10 at the desired operating speed thereof, and any change in the relative positions of record medium 10 and support housing 12 due to eccentricity, wobble, runout, thermal expansion and sundry other causes will be almost instantly automatically compensated for due to the balance of the hydrodynamic forces created. It can also be seen that when the rotation of the record medium 10 slows below that necessary for creating the desired hydrodynamic forces, the spring 30 will bias the transducer 20 to a safe position away from the surface of record medium 10.

Figures 6, 7:
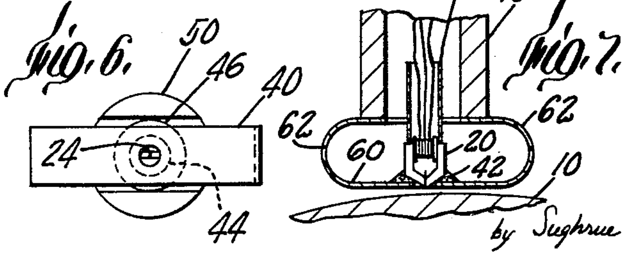
FIG. 6 is a bottom plan view of the tip of transducer head and resilient support shown in FIGS. 4 and 5.
FIG. 7 is a partial sectional elevation view illustrating further modification utilizing the principles of this invention.

A modified construction utilizing the principles of this invention is shown in FIGS. 4–6. In these figures like reference numbers, which are similar to the reference numbers in FIGS. 1 through 3, denote identical components. The modified construction includes a U-shaped resilient spring 40 which also acts as a transducer support. The transducer 20 is secured to the surface of the spring 40 by suitable cement or solder 42. The transducer 20 also includes a guard 44 for the leads thereof, which guard extends through a clearance hole 45 in the upper leg of the resilient spring 40. The spring 40 is secured to the bottom of the tubular member 16 and is normally biased to position the transducer 20 in the dotted line position of FIG. 4. The spring 40 includes an upturned portion 48 facing away from the direction of motion of the record medium 10 such that the windage effects created by the surface of the record medium 10 will be channeled by the upturned portion 48 to aid in creating the Bernoulli effects, in the nature of a venturi, during hydrodynamic conditions. The tubular member 16 includes extensions 50 on both sides thereof as shown in FIG. 5 adjacent the edges of the spring 40. During the static condition of the device, the spring 40 will retract the head 20 to a position above the extremities of extensions 50 on the tubular housing 16. In this way these extremities of tubular housing 16 may be utilized to obtain an initial setting of the heads if they are associated with a tapered record medium, in the manner disclosed in U.S. Patent Nos. 3,001,181, 3,061,822, 3,063,039 and 3,082,411 assigned to the assignee of this invention.

The operation of the device illustrated in FIGS. 4 through 6 is similar to the operation of the modification shown in FIGS. 1 through 3. The effects of the spring force 40 and the air cushion created under the transducer head will be balanced by the hydrodynamic forces created by windage in accordance with Bernoulli's theorem and the magnitude and effect of the hydrodynamic forces are dependent upon the size of the transducer head supporting surface i.e., the bottom surface of spring 40 and the linear speed of the moving record medium 10.

A further modification is shown in FIG. 7. This modification is similar to the modification of FIGS. 4–6 with the exception that the spring 60 which supports the transducer head 20 includes bends 62 at both sides thereof.

This arrangement can be utilized with a drum adapted to rotate in either direction.

While there have been shown and described and pointed out the fundamental novel features of the invention as applied to various embodiments, it will be understood that omissions and substitutions and changes in the form and details of the device illustrated and in its operation may be made by those skilled in the art without departing from the spirit of the invenion. It is the intention therefore to be limited only as indicated by the scope of the appended claims and reasonable equivalents thereof.

What is claimed is:

1. In a magnetic recording and playback apparatus of the type including a stationary housing, at least one magnetic transducer head mounted thereon and means for moving a magnetizable record surface to create a laminar film of pressurized air thereon, the improved transducer head consisting of: a tubular member fixedly mounted through an aperture in said stationary housing and having an outer end closed by a lead-in wire connecting cap and an inner end a predetermined distance away from said record surface; a magnetic transducer core and coil assembly; a support block supporting said assembly for movement toward and away from the record surface, said support block being placed in the space between the end of the tubular member and the record surface; said support block being of substantially low inertia and having a surface proximate the record surface being of a substantial area; a resilient reed hingedly securing the support block to the end of the tubular member and normally biasing said support block away from the record surface when the latter is at rest; said resilient reed substantially preventing side motion and longitudinal motion of the support block in relation to the end of tubular member and being adapted to allow the support block to be attracted toward the record surface by the hydrodynamic forces created by the movement of the laminar film of pressurized air clinging to the record surface when the latter is in motion until the support block rides on a cushion of pressurized air, whereby the support block is positioned a predetermined distance from the record surface at a predetermined velocity thereof regardless of the irregularity of said record surface; and lead-in wires connecting the magnetic transducer coil to the connecting cap on the outer end of the tubular member, said lead-in wires being routed through the interior of said tubular member.

2. An improved transducer head as claimed in claim 1 in which the biasing action of the resilient reed retracts the support block to a safe distance away from the record surface below a predetermined velocity of said record surface.

3. In a magnetic recording and playback apparatus of the type including a stationary housing, at least one magnetic transducer head mounted thereon and means for moving a magnetizable record surface to create a laminar film of pressurized air thereon, the improved transducer head consisting of: a tubular member fixedly mounted through an aperture in said stationary housing and having an outer end closed by a lead-in wire connecting cap and an inner end a predetermined distance away from said record surface; a magnetic transducer core and coil assembly; a flat spring support member supporting said assembly for movement toward and away from the record surface, the flat spring support member being of substantially low inertia and having a surface proximate the record surface being of a substantial area; one end of said flat spring member being arcuately bent for fastening to the end of the tubular member, the arcuately bent portion normally biasing the flat spring support member away from the record surface when the latter is at rest; the other end of said flat spring member being angularly bent away from said record surface; said arcuately bent flat spring support member providing a structure substantially preventing side motion and longitudinal motion of the magnetic transducer core and coil assembly in relation to the end of the tubular member and being adapted to allow the magnetic transducer core and coil assembly to be attracted toward the record surface by the hydrodynamic forces created by the movement of the laminar film of pressurized air clinging o the record surface when the latter is in motion until the flat spring member rides on a cushion of pressurized air, whereby the flat spring member is positioned a predetermined distance from the record surface at a predetermined velocity thereof regardless of the irregularity of said record surface; and lead-in wires connecting the magnetic transducer coil to the connecting cap on the outer end of the tubular member, said lead-in wires being routed through the interior of said tubular member.

4. An improved transducer head as claimed in claim 3 in which the biasing action of the arcuately bent portion of the flat spring member retracts the flat spring member to a safe distance away from the record surface below a predetermined velocity of said record surface.

5. In a magnetic recording and playback apparatus of the type including a stationary housing, at least one magnetic transducer head mounted thereon and means for moving a magnetizable record surface to create a laminar film of pressurized air thereon, the improved transducer head consisting of: a tubular member fixedly mounted through an aperture in said stationary housing and having an outer end closed by a lead-in wire connecting cap and an inner end a predetermined distance away from said record surface; a magnetic transducer core and coil assembly; a flat spring support member supporting said assembly for movement toward and away from the record surface, the flat spring support member being placed in the space between the end of the tubular member and the record surface; said flat spring support member being of substantially low inertia and having a surface proximate the record surface being of a substantial area; both ends of said flat spring member being arcuately bent for fastening to the end of the tubular member, the arcuately bent portions normally biasing the flat spring support member away from the record surface when the latter is at rest; said arcuately bent flat spring support members providing a structure substantially preventing side motion and longitudinal motion of the magnetic transducer core and coil assembly in relation to the end of the tubular member and being adapted to allow the magnetic transducer core and coil assembly to be attracted toward the record surface by the hydrodynamic forces created by the movement of the laminar film of pressurized air clinging to the record surface when the latter is in motion until the flat spring member rides on a cushion of pressurized air, whereby the flat spring member is positioned a predetermined distance from the record surface at a predetermined velocity thereof regardless of the irregularity of said record surface; and lead-in wires connecting the magnetic transducer coil to the connecting cap on the outer end of the tubular member, said lead-in wires being routed through the interior of said tubular member.

6. An improved transducer head as claimed in claim 5 in which the biasing action of the arcuately bent portions of the flat spring member retract the flat spring member to a safe distance away from the record surface below a predetermined velocity of said record surface.

7. In a magnetic recording and playback apparatus of the type comprising a stationary member, at least one magnetic transducer head mounted on the stationary member and a moving magnetizable record surface developing a film of fluid clinging to and moving with said surface, the improved transducer head comprising in combination: a stationary support means fixedly positioned from the moving record surface; low inertia movable support means rigidly supporting the transducer head core and coil assembly and defining an integral bearing surface adjacent the record surface; resilient means solely disposed between the stationary support means and the movable support means normally biasing said movable support means away from the record surface; the biasing force of the resilient means being substantially weak and normally positioning the movable support means poised in such a manner in relation to said record surface as to form a venturi having a progressively decreasing cross area causing an acceleration of the velocity of the fluid flowing under said bearing surface, whereby said movable support means is brought in close proximity to the moving record surface at a predetermined velocity thereof by a drop of ambient pressure caused by the acceleration of the flow of the film of fluid thereunder and the movable support means is caused to ride on the film of fluid in close predetermined proximity to the record surface.

8. An improved transducer head as claimed in claim 7 in which the resilient means retracts the movable support means to a predetermined distance away from the record surface as soon as the velocity of said record surface falls below a predetermined value.

9. An apparatus for setting the air gap spacing between a magnetic transducer head and a moving magnetizable record surface developing a flow of air clinging thereto, said apparatus comprising in combination: a stationary support element; a magnetic transducer head; a low inertia support member rigidly holding said transducer head, said support member having an integral bearing surface adjacent said record surface; spring means directly disposed between the stationary support element and the support member and normally urging and maintaining the support member in a non-functional first fixed position away from said record surface with the bearing surface of said support member forming a venturi-like arrangement with said record surface having a progressively decreasing cross area so as to cause an acceleration of the flow of air therethrough; said spring means allowing the support member to be forced to move to a functional second position when the decrease of ambient pressure under said support member bearing surface caused by the acceleration of the flow of air is strong enough to counteract the action of said spring means as soon as the record surface reaches a predetermined velocity causing a cushion of air flowing at substantially said predetermined velocity strong enough to support the support member bearing surface a predetermined distance away from the record surface.

10. An apparatus as claimed in claim 9 in which the support member is maintained in said functional second position by the equilibrium of the forces of the spring means and cushion of pressurized fluid in a direction away from the moving record surface and of the force due to the decrease of ambient pressure in a direction toward the moving record surface.

11. An apparatus as claimed in claim 10 in which the equilibrium of forces is broken as soon as the velocity of the record surface decreases below a predetermined value and the support member is then retracted to the first fixed position by the urging action of the spring means.

References Cited by the Examiner

UNITED STATES PATENTS

| | | | |
|---|---|---|---|
| 2,772,135 | 11/56 | Hollabaugh et al. | 340—174.1 X |
| 2,862,781 | 12/58 | Baumeister | 346—74 |
| 2,886,651 | 5/59 | Vogel | 340—174.1 |
| 2,921,144 | 1/60 | Martin | 340—174.1 |
| 2,937,240 | 5/60 | Harker | 179—100.2 |
| 2,972,738 | 2/64 | Sliter | 340—174.1 |

IRVING L. SRAGOW, *Primary Examiner.*

EVERETT R. REYNOLDS, *Examiner.*